3,078,187
DRY GELATINIZED STARCH PRODUCT ADAPTED FOR USE IN AN OIL WELL DRILLING FLUID
George T. Bravos, Chicago, Ill., and James W. Evans, Highland, Ind., assignors to American Maize Products Company, a corporation of Maine
No Drawing. Original application June 13, 1956, Ser. No. 591,014, now Patent No. 2,900,335, dated Aug. 18, 1959. Divided and this application Oct. 29, 1958, Ser. No. 770,293
4 Claims. (Cl. 127—33)

This invention relates to a dry gelatinized starch product adapted for use in an oil well drilling fluid.

In drilling oil wells a mud-like fluid including pregelatinized starch and a colloidal clay is circulated in the bore hole to carry cuttings out of the hole and cool the drill. For this purpose the drilling fluid must have certain physical characteristics and most important of these is the viscosity and water holding characteristics of the fluid. Viscosity and water holding characteristics of the drilling fluid are to a large extent determined by the starch and it has heretofore been customary to use the more expensive starches such as modified waxy maize, potato and tapioca starches. Inexpensive corn starch derived from ordinary maize has not been used to any great extent because it does not have the required viscosity and water holding characteristics of the more expensive starches.

The present invention is based upon our discovery that when ordinary corn starch is treated under certain prescribed conditions with a small amount of a water soluble alkaline earth metal salt, the viscosity and water holding characteristics of the starch is so changed that it is entirely satisfactory in oil well drilling fluids and the treated corn starch has been shown to give better performance than the more expensive starches now in use. Broadly speaking in carrying out the present invention ordinary corn starch granules in aqueous suspension containing about 10 to 45% by weight of starch solids are cooked and pasted in the presence of about 0.1 to 3.0% of a water soluble alkaline earth metal salt such as magnesium or calcium chloride and then after the starch granules are pasted the slurry is dried on steam heated rolls to give a starch product having less than about 15% moisture content by weight. The step of drying the cereal starch down to less than about 15% moisture content by weight is important and when this is done the resulting gelatinized corn starch will upon rehydration give a paste having exceptionally high viscosity and water holding capacity. In actual tests, Brookfield viscosity at the end of one minute ranged from about 156 poises to about 367 poises at 68° F. and in the so called "Wall Test" the water loss from an oil well drilling fluid was below about 12.5 mls.

In carrying out the reaction of the present invention the concentration of starch solids in the slurry is an important consideration. With starch slurries containing between about 20 to 45% by weight of starch granules it is necessary to cook and thoroughly paste the starch granules in water before the slurry is dried on steam heated rolls. If a starch slurry containing 20 to 45% by weight of starch solids is fed directly to the steam heated rolls before the granules are cooked and pasted in water then the starch will not have the desired water holding capacity. On the other hand, with a starch slurry containing less than about 20% starch solids by weight the slurry need not be precooked and it may be fed directly to the steam heated rolls and dried to 15% moisture content by weight. Slurries with less than 20% by weight starch solids take somewhat longer to dry and it is believed that in such case the starch granules are in fact pasted in water in the presence of the salt before the starch is dried to 15% moisture content. Heating and drying the starch slurry is preferably carried out on steam heated rolls but other heating and drying systems may be employed.

As to temperature, the starch is cooked and pasted in water at a temperature of about 175° F. to 212° F. as is customary in the art for pasting starch. Lower temperatures may be employed but the cooking time will increase in proportion to the drop in temperature. The temperature of the rolls is generally maintained in the neighborhood of about 290° F. which is also customary in the art for hot rolling starch.

Any of the water soluble alkaline earth metal salts may be used especially magnesium, calcium and barium chlorides but best results have been achieved with magnesium and calcium chlorides which are preferred. Only very small amounts of salt are necessary in our process and we prefer to use between about 0.1% to 3.0% of salt by weight of starch solids in the slurry. Additional amounts of salt may be used but this is just a waste of reagent and it does not improve the viscosity or water holding characteristics of the treated starch product.

As to the starch, the term corn starch as used in the specification and claims is intended to mean starch derived from ordinary maize and it excludes the more expensive corn starch derived from waxy maize. Although we do not now know the exact mechanism of the way in which the alkaline earth metal salts are effective in changing the viscosity and water holding capacity of ordinary corn starch it may well be that the salt in some way weakens the hydrogen bonds of the starch molecules to increase the viscosity and water holding capacity of the starch. On the other hand the salts may react with fatty acids present in the starch to form water insoluble soaps and thereby prevent the fatty acids from adversely influencing the viscosity and water holding characteristics of the starch. Whatever the true explanation may be, it is a fact that the water soluble alkaline metal salts are effective in changing the viscosity and water holding capacity of pasted corn starch so that the paste performs as well or even better than the more expensive starches ordinarily used in oil well drilling fluids.

The following specific examples are given to further illustrate the present invention. Unless otherwise specified parts and percentages are calculated on a weight basis.

*Example I*

400 parts of ordinary corn starch were slurried in 618 parts of water and 2.8 parts of calcium chloride were added. The mixture was cooked at 202° F. until the starch granules were pasted and the slurry was then dried on steam heated rolls to a moisture content of less than about 15% by weight. The dried treated starch was finely ground and packaged for shipment.

*Examples II Through V*

The same procedure, ingredients, and proportions of ingredients were used as in Example I with the following amounts of salt substituted in place of the 2.8 parts of calcium chloride specified in Example I.

| Example: | Calcium chloride, parts |
|---|---|
| II | 2.0 |
| III | 4.0 |
| IV | 6.0 |
| V | 0.4 |

*Example VI*

The same procedure, ingredients, and proportions of ingredients are used as specified in Example I except barium chloride is substituted for calcium chloride.

Example VII

The same procedure, ingredients and proportions of ingredients as specified in Example I are used except magnesium chloride is substituted in place of calcium chloride.

Example VIII 150 parts of ordinary corn starch were slurried in 850 parts of water and 1.5 parts of calcium chloride were added. The mixture was fed to the hot rolls as specified in Example I but without any precooking and the slurry dried to 12% by weight moisture content.

Example IX

The viscosity characteristics of the products produced in Examples I through V were tested on a Brookfield viscosimeter with a No. 4 spindle operated at 12 r.p.m. with 10.0% by weight of pregelatinized starch solids in aqueous liquid held at 68° F. Brookfield readings are expressed in poises.

| Sample of Example | Brookfield Reading | | | |
| --- | --- | --- | --- | --- |
| | 1 min. | 3 min. | 5 min. | 15 min. |
| I | 36.7 | 49.5 | 50.0 | (¹) |
| II | 34.0 | 45.9 | 49.8 | 50.0 |
| III | 29.7 | 40.6 | 40.3 | 39.9 |
| IV | 30.9 | 41.2 | 43.2 | 44.1 |
| V | 15.6 | 18.0 | 18.7 | 19.0 |
| Control: pasted corn starch—no salt treatment | 5.3 | 8.1 | 9.4 | 9.9 |
| Modified waxy corn starch—no salt treatment | 34.3 | 46.5 | 48.2 | 50.0 |

¹ Too viscous to record.

Example X

The water holding characteristics of the products of Examples I through V and VIII tested in an oil well drilling fluid in accordance with established procedure gave the following results:

A drilling fluid was prepared by adding 4275 mls. of saturated salt (NaCl) solution at room temperature to 225 g. salt gel (Attapulgus mud). The slurry is mixed and then agitated at high speed as in a Waring Blendor for 10 minutes and allowed to stand for 16 hours before use. Four grams of the starch product to be tested are added to 350 ml. of the drilling fluid and mixed in a Waring Blendor for 60 seconds at high speed. The mixture is then transferred to a Hamilton Beach mixer and mixed for 10 minutes at high speed. The oil well drilling fluid is then placed in a filter cup having a filtration area of 7 square inches. A constant gas pressure of 100 pounds per square inch is applied to the filter cup and the amount of filtrate obtained in 30 minutes is measured and recorded in milliliters. The value is the "water loss" or "Wall Test" and the smaller the value, the greater the water holding capacity of the starch.

Treated starch of example:    Wall test, ml.
- I — 8.5
- II — 8.8
- III — 8.2
- IV — 8.0
- V — 12.5
- VI — 8.2
- Control: pasted corn starch—no salt treatment — 15.5
- Modified waxy corn starch—no salt treatment — 8.1
- Waxy corn starch—no salt treatment — 8.6

It will be understood that in practice the exact composition of drilling fluids will be different for different drilling operations and each operator uses a particular composition which he believes to be superior. In general the amount of gelatinized starch employed in a drilling fluid will not exceed about 4 to 5% by weight of the drilling fluid. More starch may of course be used but the viscosity of the mud should not exceed that at which it may be conveniently pumped with standard equipment.

Examples XI through XV

The procedure, ingredients, and proportions of ingredients of Example III were used in these examples with the exception that the starch slurry contained the following percentages of starch solids by weight of slurry. Wall tests were made as described in Example X with the following results:

| Example | Percent by weight starch solids in slurry | Wall Test, ml. |
| --- | --- | --- |
| XI | 20.5 | 8.5 |
| XII | 25.0 | 8.8 |
| XIII | 34.0 | 8.2 |
| XIV | 39.3 | 8.2 |
| XV | 45.2 | 11.5 |

For the purpose of illustration the present invention has been described in connection with the preparation of oil well drilling muds but it will be understood that the viscosity and water holding characteristics of the treated corn starch make the product valuable in the paper industry in sizing operations and in certain cases in the food industry as a substitute for the more expensive starches currently in use.

It will be understood that it is intended to cover all changes and modifications of the preferred form of the invention herein chosen for the purpose of illustration which do not constitute departures from the spirit and scope of the invention.

This application is a division of applicants' application Serial No. 591,014, filed June 13, 1956, now issued as Patent No. 2,900,335.

What we claim is:

1. A dried gelatinized starch which when slurried in ordinary water has a water holding capacity equivalent to a "Wall Test" less than 12.5 ml. water loss which is prepared by heating starch granules at elevated temperature in water containing a water soluble alkaline earth metal salt and about 10 to 45% starch solids by weight until substantially all the starch granules are pasted and then heating and drying the slurry to less than about 15% moisture content by weight of starch and thereafter recovering the dry pasted starch product.

2. A product as specified in claim 1 in which the starch is prepared by cooking it in the presence of about 0.1% to 3.0% of the water soluble alkaline earth salt.

3. A dried gelatinized corn starch complex containing between about 0.1 to 3.0% of a water soluble alkaline earth metal salt and less than about 15% moisture content by weight of starch which when slurried in ordinary water will increase the viscosity of the slurry and form a paste.

4. A dried gelatinized starch complex which contains between about 0.1 to 0.3% of a water soluble alkaline earth metal salt by weight of starch solids which when slurried in ordinary water will increase the viscosity of the slurry and form a paste which is prepared by heating starch granules at elevated temperature in ordinary water containing only such water soluble alkaline earth metal salt and about 10 to 45% starch solids by weight until substantially all the starch granules are pasted and then drying the slurry to less than about 15% moisture content by weight of starch and thereafter recovering the dry pasted starch product.

(References on following page)

References Cited in the file of this patent

UNITED STATES PATENTS

| | | |
|---|---|---|
| 2,221,552 | Nicolson | Nov. 12, 1940 |
| 2,417,307 | Larsen | Mar. 11, 1947 |
| 2,508,533 | Olsen | May 23, 1950 |
| 2,514,055 | Hansen | July 4, 1950 |
| 2,600,404 | Hoeppel | June 17, 1952 |
| 2,658,035 | Bode | Nov. 3, 1953 |
| 2,845,367 | Alt et al. | July 29, 1958 |
| 2,900,335 | Bravos | Aug. 18, 1959 |
| 2,951,776 | Scallet | Sept. 6, 1960 |

OTHER REFERENCES

Starch and its Derivatives, by Radley, Van Nostrand Co., Inc., New York, N.Y., 1944, pages 273–275.

UNITED STATES PATENT OFFICE

CERTIFICATE OF CORRECTION

Patent No. 3,078,187　　　　　　　　　　　　　　February 19, 1963

George T. Bravos et al.

It is hereby certified that error appears in the above numbered patent requiring correction and that the said Letters Patent should read as corrected below.

Column 3, line 65, for "VI" read -- VIII --.

Signed and sealed this 10th day of September 1963.

(SEAL)
Attest:

ERNEST W. SWIDER
Attesting Officer

DAVID L. LADD
Commissioner of Patents